United States Patent [19]

Kolombos et al.

[11] 4,087,350

[45] May 2, 1978

[54] OLEFINS PRODUCTION BY STEAM CRACKING OVER MANGANESE CATALYST

[75] Inventors: Alexander John Kolombos, Sutton; Donald McNeice, Reigate; Dennis Charles Wood, Sunbury, all of England

[73] Assignee: The British Petroleum Company Limited, London, England

[21] Appl. No.: 719,918

[22] Filed: Sep. 2, 1976

[30] Foreign Application Priority Data

Sep. 25, 1975 United Kingdom ............... 39283/75

[51] Int. Cl.$^2$ ...................... C07C 11/04; C10G 11/04; B01J 8/24
[52] U.S. Cl. ..................................... 208/121; 208/119; 252/454; 252/455 R; 252/471; 260/683 R

[58] Field of Search ............................... 208/119, 121; 260/683 R

[56] References Cited

U.S. PATENT DOCUMENTS

| 3,541,179 | 11/1970 | Okagami et al. .................. 260/683.3 |
| 3,575,848 | 4/1971 | Miale ..................................... 208/112 |
| 3,725,495 | 4/1973 | Wrisberg et al. ................ 260/683 R |

Primary Examiner—Delbert E. Gantz
Assistant Examiner—G. E. Schmitkons
Attorney, Agent, or Firm—Brooks, Haidt, Haffner & Delahunty

[57] ABSTRACT

This invention relates to a process for producing olefins by cracking atmospheric/vacuum residue boiling above 500° C in the presence of steam over a fluidized manganese catalyst.

8 Claims, No Drawings

OLEFINS PRODUCTION BY STEAM CRACKING OVER MANGANESE CATALYST

The present invention relates to a process for the production of gaseous olefins from petroleum residue feedstocks.

Ethylene, propylene and butadiene which are basic intermediates for a large proportion of the petro-chemical industry are obtained in the main by thermal cracking of petroleum gases and distillates such as naphtha and gas oil. There is a world-wide increase in demand on the use of these lighter components of petroleum and it is desirable that heavier feedstocks, particularly those boiling above 300° C at atmospheric pressure, be utilised for olefin production. In the past, a number of problems have arisen in the cracking of heavier feedstocks which have so far prevented their use in the economic production of light olefins. The principal problems were:

1. Excessive coke deposition in the cracking tubes which reduces heat transfer, thereby necessitating higher tube skin temperatures. Excessive coke deposition also restricts flow in the cracking tubes, and ultimately leads to blockages. The coke must be removed at frequent intervals by burning out, involving plant-shut-down for an excessive proportion of time on-stream.

2. Tar deposition in the transfer lines and heat exchanges reduces the efficiency of heat recovery and requires plant shut-down for cleaning, again impairing the overall efficiency of operation.

3. Low yields of olefin products compared with those from lighter feedstocks necessitate increased feedstock and fuel requirements with extra furnaces, heat exchanges and other equipment involving much higher initial capital investment.

It has now been found that by a careful choice of catalyst and suitable reactor, the yield of olefins can be improved and the coke deposition reduced substantially when using heavier feedstocks.

Accordingly, the present invention is a method of producing olefins by cracking at elevated temperature in the presence of steam a hydrocarbon feedstock consisting essentially of atmospheric residue and/or vacuum residue boiling above 500° C over a catalyst comprising a manganese compound in a fluidised bed.

In the operation of a typical oil refinery, crude oil is initially fed to a distillation unit where it is separated at atmospheric pressure into benzine (motor spirit), a naphtha, kerosine and gas oil. The residue from the atmospheric distillation unit is composed essentially of atmospheric and vacuum residue fractions boiling above 500° C at atmospheric pressure. It is this residue which is used as feedstock in the present invention.

One of the features of the present invention is the use of a manganese compound as catalyst. The manganese compound is preferably manganese dioxide although other manganese compounds may be envisaged. The manganese compound is suitably supported on a refractory oxide such as zirconia, titania, silica or alumina.

The catalyst is prepared by impregnating the support with a soluble manganese compound such as manganese nitrate, followed by heating to convert the nitrate to the oxide. The support catalyst may suitably contain between 1 and 20% preferably between 5 and 15% by weight of manganese.

The steam used in the steam cracking reaction also enables the catalyst to be maintained in a fluidised condition. When contacting with the fluidised catalyst in a reactor, the hydrocarbon feedstock and steam may be introduced either in co-current or counter-current fashion with the fluidised catalyst in between such that hydrocarbon is introduced into the catalyst under force of gravity.

The temperature of steam being introduced into the catalyst bed is suitably above 800° C, preferably between 800° and 1000° C such that it maintains the catalyst bed in a fluid state at a temperature of between 600° and 800° C. The hydrocarbon feedstock being introduced in the opposite direction is preferably sprayed and has a temperature below 400° C, most preferably between 200° and 300° C at the point of entry into the reactor. The temperature of the feedstock at its point of entry into the reactor may be controlled either by adjusting the position of the injection nozzle relative to the catalyst bed or by a stem annulus surrounding the nozzle to lower the temperature.

The reactor suitably has a frustro-conical shape with the feedstock being gravity fed from the top of the reactor and the steam being introduced from the bottom of the reactor so that it maintains the catalyst in between in a fluidised state. The product gases and olefins are withdrawn from the top of the reactor. It will be understood that the physical shape of the reactor is not critical since variations in design can be conceived by those skilled in the art.

The invention is further illustrated with reference to the following Examples:

EXAMPLE

1. Catalyst Preparation:

(a) $MnO_2/TiO_2$ 136 g manganese nitrate solution (50% w/w solution as $Mn(NO_3)_2, 6H_2O$) were added to 206g titanium dioxide and 150 ml distilled water to form a white slurry. The slurry was evaporated to dryness over a hot plate, then finally oven dried at 120° C. The catalyst was then heated to 400° C for 2 hours to decompose the nitrate to the oxide, and finally for a further 2 hours at 600° C. The catalyst was broken down to between BSS mesh 25-60 for use in the fluidised bed.

(b) $MnO_2/ZrO_2$ 66 g manganese nitrate solution (50% w/w solution was $Mn(NO_3)_2, 6H_2O$) were added to 90g zirconium dioxide pellets. The mixture was evaporated to dryness over a steam bath and then dried overnight at 120° C. The catalyst was heated to 600° C in air overnight before use.

2. Cracking

The steam cracking was carried out by placing the $MnO_2/TiO_2$ (66g) catalyst charge occupying 50 ml volume in the body of the reactor and partially fluidising the bed with steam, which was preheated to between 800° and 1000° C and then passed up through the distributor. Kuwait atmospheric residue (1 ml/min) was dropped vertically onto the fluidised catalyst bed controlling the temperature of the hydrocarbon, at its injection point, between 250° and 300° C by adjusting the nozzle injection position relative to the catalyst bed. After 1 hour a sample of the reaction products was taken and analysed (see Table). No coke was observed on the catalyst bed after feeding the residue for 2 hours.

TABLE

| Catalyst | 9%MnO$_2$/TiO$_2$ | |
|---|---|---|
| Reactor | Moving Bed | |
| Feed | Kuwait atmospheric residue | |
| Products (% wt on feed) | Example 1 | Example 2 |
| Temp | 825° | 745° |
| H$_2$O: Hydrocarbon wt. ratio | 2.0:1 | 2.6:1 |
| Hydrogen | 2.7 | 0.9 |
| Methane | 14.6 | 9.8 |
| Ethylene | 19.2 | 18.6 |
| Ethane | 0.7 | 3.3 |
| Propylene | 5.8 | 10.0 |
| Butadiene | 1.9 | 3.0 |
| Other C4's | 0.8 | 2.6 |
| C5+ | 39.3 | 42.9 |
| CO$_2$ | 23.0 | 4.0 |
| H$_2$S | 1.8 | 1.3 |

We claim:

1. A process of producing olefins by cracking at elevated temperature in the presence of steam a hydrocarbon feedstock consisting essentially of atmospheric residue and/or vacuum residue boiling above 500° C over a catalyst consisting essentially of manganese oxide supported on a refractory oxide selected from the group consisting of zirconia and titania in a fluidized bed reactor.

2. A process according to claim 1 wherein the manganese oxide is manganese dioxide.

3. A process according to claim 1 wherein the supported catalyst contains between 1 and 20% by weight of manganese.

4. A process according to claim 1 wherein the catalyst bed is maintained in a fluidised state by means of the pressure of reactant steam.

5. A process according to claim 1 wherein the cracking is carried out by bringing the steam and hydrocarbon feedstock into contact with the catalyst bed in counter current fashion.

6. A process according to claim 5 wherein the hydrocarbon feedstock is brought into contact with the catalyst bed under force of gravity.

7. A process according to claim 1 wherein the temperature of the catalyst bed is between 600° and 800° C.

8. A process according to claim 1 wherein the temperature of the hydrocarbon feedstock at the point of entry into the reactor is below 400° C.

* * * * *